Aug. 9, 1938.  W. H. MONTGOMERY  2,125,945
TORQUE INDICATION WRENCH
Filed Dec. 21, 1937
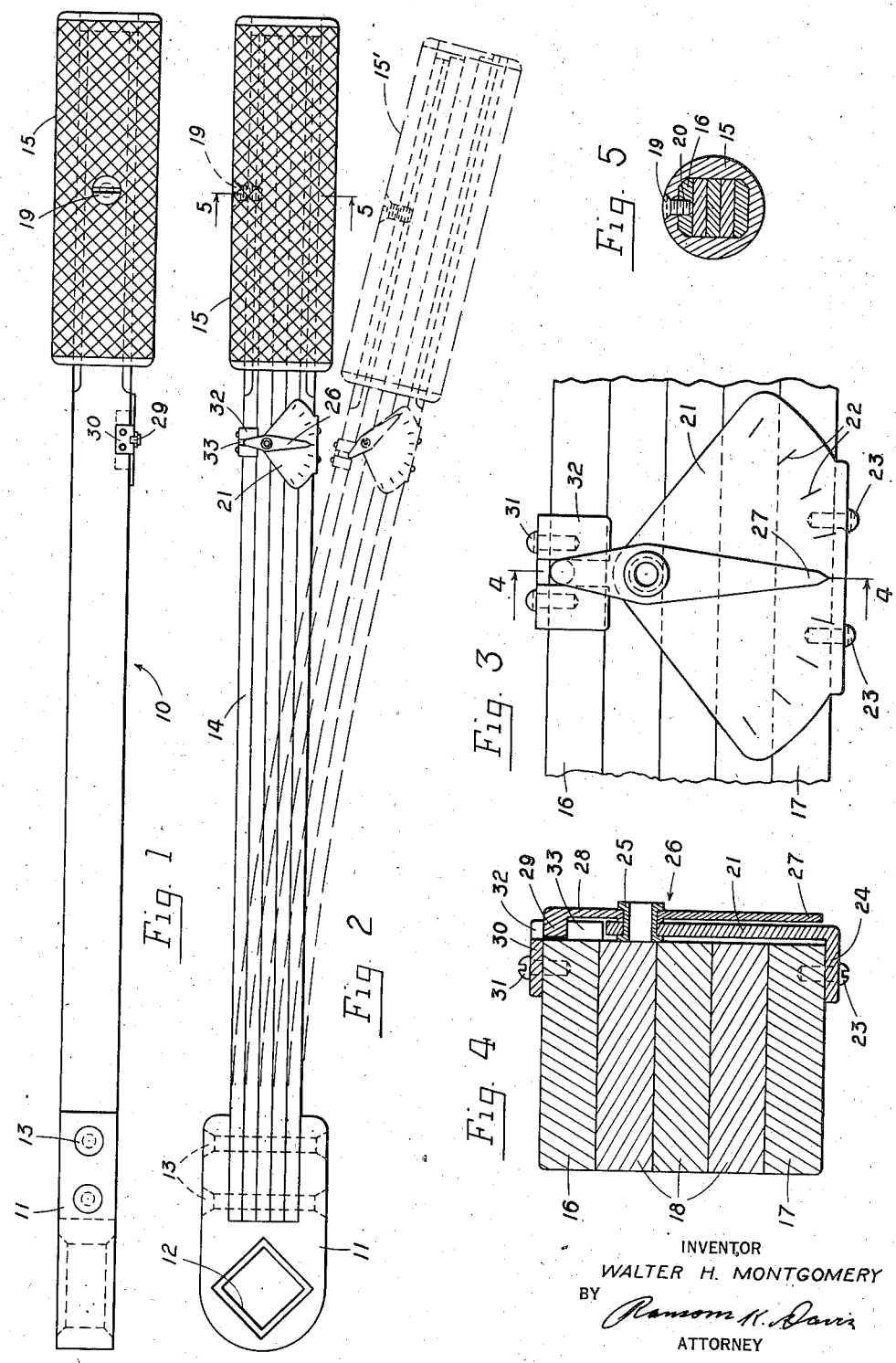
INVENTOR
WALTER H. MONTGOMERY
BY
Ransom K. Davis
ATTORNEY Patented Aug. 9, 1938

2,125,945

UNITED STATES PATENT OFFICE 2,125,945

TORQUE INDICATION WRENCH

Walter H. Montgomery, Washington, D. C.

Application December 21, 1937, Serial No. 180,997

4 Claims. (Cl. 265—1)

(Granted under the act of March 3, 1883, as amended April 30, 1928; 370 O. G. 757)

This wrench has application in connection with the assembly of aircraft and automotive cylinder holding studs, propeller studs and similar parts where a uniform pull on all members of a predetermined amount is desired.

This invention is particularly applicable to socket wrenches which are used in the assembly of bolted pipe joints, couplings, clamps, sleeves, repair devices and other fittings. In such devices it is customary to employ a plurality (usually a circular series) of bolts and nuts to effect the compression of rubber or other elastic packing, and seal the joint, coupling or other device. The operator frequently must work in a confined space, frequently in a ditch, in the case of pipe lines for natural gas and the like, and where high internal liquid or gaseous pressures are involved, the bolts must be set up with very great pressure. Obviously the effectiveness of the seal may be partly or entirely destroyed by unequal distribution of pressure on the elastic packing material, resulting in subsequent cold flow from regions of high pressure to regions of low pressure. Inequality of bolt strain also tends to bring about undesired strain on the metal parts of the coupling or other device, with the usual result that clearances are eliminated at certain points, permitting metal-to-metal contact and relieving compression on the packing, while at other points clearances are increased, permitting exudation of the packing material, loss of compression, and even the blowing out of the packing. Aside from the effects on the packings, the application of excessive strain to bolts may produce injury to the connected metal parts, or the stripping of the threads of bolts and nuts, and even fracture of the bolts.

The physical strength of operators varies, and the leverage at which their force is exerted may frequently vary and generally it has been found by experiment that it is practically impossible for an operator to judge with any reasonable degree of accuracy to what a degree of strain a bolt is tightened, or to secure any uniformity in the tightening of bolts of a series.

A further object of this invention is to provide an improved wrench of the type shown in Kennedy et al. 1,728,552 Sept. 17, 1929, but improved thereover, particularly in that the indicating features of this invention do not occupy any more than the normal thickness of the wrench handle, and hence is not liable to injury or breakage by projecting there beyond any substantial distance, and further avoiding any interference with the normal use of the wrench.

With the foregoing and other objects in view, the invention consists in the construction, combination and arrangement of parts hereinafter described and illustrated in the drawing, in which Fig. 1 is top plan view of the wrench of this invention.

Fig. 2 is a side elevation of Fig. 1.

Fig. 3 is an enlarged view of the torque indicating mechanism.

Fig. 4 is a sectional view of lines 4—4 of Fig. 3, and

Fig. 5 is a sectional view of line 5—5 of Fig. 2.

There is shown at 10 the wrench of this invention, which consists of a socket bar 11 having a squared socket-receiving aperture 12 therein, to which is riveted as at 13 a shank 14 at the other end of which is provided a handle 15. The shank 14 consists of a pair of outer corrosion resistant steel plates 16 and 17, between which are a plurality of similar plates 18, all of which are held together at socket bar end 11 by the riveting 13.

As will be apparent, these plates are yieldable as thus mounted together so that the handle end 15 may move in the direction of the position 15' whenever the socket bar 11 is prevented from turning freely as by a bolt or nut reaching its tightened position. The handle 15 is secured to the shank 14 by being shaped to fit snugly over the end of the shank 14 and having a set screw 19 extending into a corresponding threaded aperture 20 in plate 16, both ends of the handle 15 being opened so that the individual plates 17 and 18 may slidably fit therein.

The torque indicating mechanism is mounted on the shank 14 so as to magnify the amount of movement between fixed points on the plates 16 and 17 of shank 14. A sector shaped plate 21 carrying indicator marks 22 is mounted on the plate 17 by means of screws 23 passing through a flange 24 thereof. At the apex of the sector shaped plate 21 there is secured a double headed rivet 25 on which is pivoted a pointer 26 having a long indicating end 27 adapted to pass over the indicator marks 22, and a short end 28 having a projecting boss 29.

Affixed to the plate 16 by means of a flange 30 and set screws 31 is a channel member 32 providing a trackway 33 in which the boss 29 is guided.

In operation, the wrench 10 is applied to the bolt or nut to be tightened by means of any conventional socket having a squared fit in the aperture 12 of the socket bar 11. Turning pressure is applied to the handle 15 and as the bolt approaches its tight position it will resist this turning pressure, causing the shank 14 to bend as the handle moves from position 15 toward the position 15'. This will cause relative displacement between any two points on the upper plate 16 and lower plate 17, the channel member 32 being fixed to one of these points on the plate 16 and the sector shaped member 21 being affixed to the other of these points. As this movement takes place the boss 29, traveling in the trackway 33, will cause the pointer 26 to move the indicator end 27 in one direction or the other, depending on the direction that the plate is being turned. The indicator end 27 will travel over the indicating marks 22 which have been previously calibrated by test to indicate the amount of strain that is being placed on the nut or bolt in the tightening operation. By watching the indicator 27 the operator may be sure of placing just the right amount of tension on each bolt or nut that he is putting in position, and avoid the danger of leaving it too loose or over tightening it.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. A torque indicating wrench, comprising a bolt or nut cooperating means at one end, a handle at the other end, and a shank affixedly secured to the bolt or nut cooperating means, said shank comprising a plurality of flat plates held together only at the bolt or nut cooperating means by the shank affixing means, and means affixed on the two outermost plates of the shank for indicating the relative displacement thereof under bending movement.

2. A torque indicating wrench, comprising a bolt or nut cooperating means at one end, a handle at the other end, and a shank affixedly secured to the bolt or nut cooperating means, said shank comprising a plurality of flat plates held together only at the bolt or nut cooperating means by the shank affixing means, and means affixed on the two outermost plates of the shank for indicating the relative displacement thereof under bending movement, the handle being affixed to one outer plate of the shank and slidably receiving the remaining plates of the shank therethrough.

3. A torque indicating wrench, comprising a bolt or nut cooperating means at one end, a handle at the other end, and a shank affixedly secured to the bolt or nut cooperating means, said shank comprising a plurality of flat plates held together only at the bolt or nut cooperating means by the shank affixing means, and means affixed on the two outermost plates of the shank for indicating the relative displacement thereof under bending movement, said indicating means comprising a pointer, pivoted foundation means affixed to one outer plate on which the pointer is pivoted, and a guide means affixed to the other outer plate for moving the other end of the pointer as the wrench is operated under stress.

4. A torque indicating wrench, comprising a bolt or nut cooperating at one end, a handle at the other end, and a shank affixedly secured to the bolt or nut cooperating means, said shank comprising a plurality of flat plates held together only at the bolt or nut cooperating means by the shank affixing means, and means affixed on the two outermost plates of the shank for indicating the relative displacement thereof under bending movement, said indicating means comprising a sector shaped indicating sheet affixed to one outer shank plate, a pointer pivoted at the apex of said sheet, indicator marks carried by said sheet over which the long arm of the pointer may travel, an opposite short arm of said pointer carrying a boss, a channel member affixed to the other outer plate and having a trackway within which said short arm pointer boss is guided, whereby relative movement between the outer plates is magnified and indicated by the pointer.

WALTER H. MONTGOMERY.